(12) United States Patent
Taoka (10) Patent No.: US 12,247,355 B2
(45) Date of Patent: Mar. 11, 2025

(54) COATING AGENT FOR PAPER AND COATED PAPER USING SAME (71) Applicant: KURARAY CO., LTD., Okayama (JP)

(72) Inventor: Yuta Taoka, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 300 days.

(21) Appl. No.: 17/769,529

(22) PCT Filed: Oct. 15, 2020

(86) PCT No.: PCT/JP2020/038859
§ 371 (c)(1),
(2) Date: Apr. 15, 2022

(87) PCT Pub. No.: WO2021/075480
PCT Pub. Date: Apr. 22, 2021

(65) Prior Publication Data
US 2023/0142880 A1 May 11, 2023

(30) Foreign Application Priority Data

Oct. 16, 2019 (JP) .................. 2019-189779
Dec. 26, 2019 (JP) .................. 2019-237551

(51) Int. Cl.
D21H 19/12 (2006.01)
C08F 297/02 (2006.01)
(Continued)

(52) U.S. Cl.
CPC ........... *D21H 19/12* (2013.01); *C08F 297/02* (2013.01); *C09D 5/00* (2013.01); *C09D 153/005* (2013.01);
(Continued)

(58) Field of Classification Search
None
See application file for complete search history.

(56) References Cited

U.S. PATENT DOCUMENTS 5,240,997 A * 8/1993 Yanai ..................... B29C 48/00
525/60
2016/0194514 A1 7/2016 Henderson
(Continued)

FOREIGN PATENT DOCUMENTS

EP 3783039 A1 2/2021
EP 3998003 A1 5/2022
(Continued)

OTHER PUBLICATIONS

Inagaki, H., Method for Producing Converted Paper, Sep. 21, 2021, machine translation of JP2001-254292 (Year: 2001).*
(Continued)

*Primary Examiner* — Chinessa T. Golden
(74) *Attorney, Agent, or Firm* — Morgan, Lewis & Bockius LLP (57) ABSTRACT A coating agent for paper comprises: an ethylene-vinyl alcohol copolymer, wherein the ethylene-vinyl alcohol copolymer has a content of ethylene units of 1 mol % or more and less than 20 mol % and a block character of the ethylene units from 0.90 to 0.99. Coated paper is obtained by coating paper with such a coating agent. The coating agent of the present invention is excellent in viscosity stability and also causes the resulting coated paper to be excellent in barrier properties and water resistance.

20 Claims, 2 Drawing Sheets (51) Int. Cl.
*C09D 5/00* (2006.01)
*C09D 153/00* (2006.01)
*D21H 21/16* (2006.01)
*D21H 27/00* (2006.01)

(52) U.S. Cl.
CPC .......... D21H 21/16 (2013.01); D21H 27/001 (2013.01); *C08F 2810/00* (2013.01)

(56) References Cited

U.S. PATENT DOCUMENTS

2017/0226247 A1* 8/2017 Kumaki .................. C09J 7/21
2019/0292359 A1* 9/2019 Inoue ..................... B32B 21/08
2021/0108111 A1 4/2021 Tanida et al.

FOREIGN PATENT DOCUMENTS

| EP | 3998291 A1 | | 5/2022 |
| JP | H08-81666 A | | 3/1996 |
| JP | 11-21788 A | | 1/1999 |
| JP | 2001254292 A | * | 9/2001 |
| JP | 2015516472 A | * | 6/2015 |
| JP | 2017-043872 A | | 3/2017 |
| WO | 2013/130704 A1 | | 9/2013 |
| WO | 2019/203216 A1 | | 10/2019 |

OTHER PUBLICATIONS

Ionomer Polyvinylalcohol Blends and Coatings, Jun. 11, 2015, machine translation of JP2015-516472 (Year: 2015).*
International Search Report issued in corresponding International Patent Application No. PCT/JP2020/038859 dated Dec. 22, 2020.
Extended European Search Report issued in the corresponding Application No. 20876913.3 dated Nov. 8, 2023.
Kanekiyo M et al., "A structural study of (ethylene vinyl alcohol) copolymers by high resolution solid state 13C NMR", Polymer, Elsevier, Amsterdam, NL, 2000, vol. 41, pp. 2391 2404, XP085002547, ISSN: 0032 3861, DOI:10.1016/S0032 3861(99)00394-8.

* cited by examiner

COATING AGENT FOR PAPER AND COATED PAPER USING SAME

TECHNICAL FIELD

The present invention relates to a coating agent for paper containing an ethylene-vinyl alcohol copolymer. The present invention also relates to coated paper using the coating agent and a method of producing the same.

BACKGROUND ART

Vinyl alcohol-based polymers represented by polyvinyl alcohols (hereinafter, may be abbreviated as "PVAs") are known as water-soluble synthetic polymers and widely used as materials for vinylon, which is synthetic fiber, paper treatment agents, fiber treatment agents, adhesives, stabilizers for emulsion polymerization and suspension polymerization, binders for inorganic materials, films, and the like. In particular, it is known that coating of paper with such a PVA allows an increase in paper strength, imparting water resistance, grease resistance, and gas barrier properties, and the like, and coated paper obtained by coating paper with such a vinyl alcohol-based polymer is widely used. The vinyl alcohol-based polymer is also used as an auxiliary used together with additives to give paper functionality, such as binders for inorganic materials and dispersion stabilizers.

Among various kinds of coated paper, particularly in the field of release paper, PVA-based polymers are generally used as a filling layer (barrier layer) to reduce voids between pulp fibers constituting the paper and improve the yield of silicone used for coating the paper surface. Among all, partially saponified PVAs are preferably used because of the excellent barrier properties.

However, such a partially saponified PVA has poor water resistance and causes elution of the PVA due to humidification during adhesive processing and the like, leading to problems of blocking and not allowing use of water-dispersible varnish in post-treatment, and thus the problems have been expected to be solved.

Patent Document 1 describes that use of a coating solution containing an ethylene modified PVA and carboxymethylcellulose allows obtaining both barrier properties and water resistance.

The coating solution, however, sometimes has insufficient viscosity stability. In addition, shear stress is applied to the coating solution during preparation and coating of the solution, causing many fiber-like precipitates, and thus the processability is susceptible to improvement.

PRIOR ART DOCUMENTS

Patent Documents

Patent Document 1: JP 11-21788 A

SUMMARY OF THE INVENTION

Problems to be Solved by the Invention

The present invention has been made based on the situations as described above and it is an object thereof to provide a coating agent that is excellent in viscosity stability and also capable of obtaining coated paper excellent in barrier properties and water resistance.

Means for Solving the Problems

The above problems are solved by providing a coating agent for paper comprising: an ethylene-vinyl alcohol copolymer, wherein the ethylene-vinyl alcohol copolymer has a content of ethylene units of 1 mol % or more and less than 20 mol % and a block character of the ethylene units from 0.90 to 0.99.

In this situation, it is preferred that the coating agent further comprises from 0.000001 to 0.01 parts by mass of a compound with a molecular weight of 1000 or less having a conjugated double bond based on 100 parts by mass of the ethylene-vinyl alcohol copolymer. It is also preferred that the ethylene-vinyl alcohol copolymer has a degree of saponification from 80 to 99.7 mol %. It is also preferred that the ethylene-vinyl alcohol copolymer has a viscosity-average degree of polymerization from 300 to 5000. It is also preferred that the coating agent further comprises an ionomer.

The above problems are also solved by providing a coating agent for paper comprising: an ethylene-vinyl alcohol copolymer and an ionomer, wherein the ethylene-vinyl alcohol copolymer has a content of ethylene units of 1 mol % or more and less than 20 mol %.

In this situation, it is preferred that the coating agent further comprises from 0.000001 to 0.01 parts by mass of a compound with a molecular weight of 1000 or less having a conjugated double bond based on 100 parts by mass of the ethylene-vinyl alcohol copolymer. It is also preferred that the ethylene-vinyl alcohol copolymer has a degree of saponification from 80 to 99.7 mol %. It is also preferred that the ethylene-vinyl alcohol copolymer has a viscosity-average degree of polymerization from 300 to 5000.

Coated paper obtained by coating paper with the coating agent is a preferred embodiment of the present invention. It is more preferred that the coated paper is base paper for release paper. It is also more preferred that the coated paper is greaseproof paper. A method of producing coated paper, the method comprising coating paper with the coating agent is another preferred embodiment of the present invention.

Effects of the Invention

The coating agent for paper of the present invention containing the ethylene-vinyl alcohol copolymer having a specific structure is excellent in viscosity stability. In addition, use of the coating agent provides coated paper, in particular release paper and greaseproof paper, excellent in barrier properties and water resistance.

MODES FOR CARRYING OUT THE INVENTION

A coating agent for paper of the present invention comprises: an ethylene-vinyl alcohol copolymer, wherein the ethylene-vinyl alcohol copolymer has a content of ethylene units of 1 mol % or more and less than 20 mol % and a block character of the ethylene units from 0.90 to 0.99.

Ethylene-Vinyl Alcohol Copolymer

The coating agent for paper of the present invention contains an ethylene-vinyl alcohol copolymer characterized in having a content of ethylene units of 1 mol % or more and less than 20 mol % and a block character of the ethylene units from 0.90 to 0.99. These points are described below.

Block Character of Ethylene Units

A major characteristic of the ethylene-vinyl alcohol copolymer is that the block character of the ethylene units is from 0.90 to 0.99. The block character of 0.90 or more improves viscosity stability of the coating agent and also improves barrier properties of coated paper to be obtained. The block character is preferably 0.93 or more and more preferably 0.95 or more. Meanwhile, the block character is 0.99 or less. The block character of 0.99 or less improves water resistance of coated paper to be obtained.

It should be noted that the block character is a numerical value that indicates the distribution of the ethylene units and vinyl alcohol units formed by saponification of vinyl ester units and takes values between 0 and 2. The value "0" indicates that the ethylene units or the vinyl alcohol units are distributed fully blockwise. With an increase in the value, both units are distributed more alternately. The value "1" indicates that the ethylene units and the vinyl alcohol units are completely randomly present. The value "2" indicates that the ethylene units and the vinyl alcohol units are completely alternately present. The block character is determined by $^{13}$C-NMR as follows. First, an ethylene-vinyl alcohol copolymer is saponified to a degree of saponification of 99.9 mol % or more, followed by thorough washing with methanol and drying at 90° C. under reduced pressure for 2 days. The completely saponified ethylene-vinyl alcohol copolymer thus obtained is dissolved in DMSO-$d_6$ and then the sample thus obtained is subjected to measurement using a 500 MHz $^{13}$C-NMR spectrometer (JEOL GX-500) at 80° C. Using a molar fraction of vinyl alcohol-ethylene two-unit chains (AE), a molar fraction of the vinyl alcohol units (A), and a molar fraction of the ethylene units (E) assigned and calculated from the obtained spectrum as described in T. Moritani and H. Iwasaki, 11, 1251-1259, Macromolecules (1978), a block character (η) of the ethylene units is determined according to the following equation:

$$\eta = (AE)/\{2 \times (A) \times (E)\}$$

The ethylene-vinyl alcohol copolymer having the block character of the ethylene units defined above can be produced by a special method comprising a polymerization step and a saponification step described later. As a result of intensive studies, the present inventors successfully controlled the block character of the ethylene units using such a production method. They have also found that the block character of the ethylene units in the range described above improves the viscosity stability of the coating agent and also improves the barrier properties and the water resistance of coated paper to be obtained. The ethylene-vinyl alcohol copolymer of the present invention will be further detailed below.

Vinyl Ester

The ethylene-vinyl alcohol copolymer of the present invention is produced by copolymerizing ethylene and a vinyl ester to give an ethylene-vinyl ester copolymer and then saponifying the ethylene-vinyl ester copolymer. Examples of the vinyl ester to be used include vinyl formate, vinyl acetate, vinyl propionate, vinyl valerate, vinyl caprate, vinyl laurate, vinyl stearate, vinyl benzoate, vinyl pivalate, and vinyl versatate, particularly preferably vinyl acetate.

Ethylene Unit Content

The ethylene-vinyl alcohol copolymer of the present invention has a content of the ethylene units of 1 mol % or more and less than 20 mol %. If the ethylene unit content is less than 1 mol %, coated paper to be obtained has low water resistance. The ethylene unit content is preferably 1.5 mol % or more, more preferably 2 mol % or more, and even more preferably 2.5 mol % or more. If the ethylene unit content is 20 mol % or more, the ethylene-vinyl alcohol copolymer is insoluble in water and preparation of an aqueous solution becomes difficult. The ethylene unit content is preferably 15 mol % or less, more preferably 10 mol % or less, and even more preferably 8.5 mol % or less.

The ethylene unit content is determined, for example, from $^1$H-NMR of a precursor of an ethylene-vinyl alcohol copolymer or an ethylene-vinyl ester copolymer as a re-acetylated product by the following method. A sample of the ethylene-vinyl ester copolymer is purified by reprecipitation three or more times using a mixed solution of n-hexane and acetone and then dried at 80° C. under reduced pressure for 3 days to prepare an ethylene-vinyl ester copolymer for analysis. The ethylene-vinyl ester copolymer thus obtained is dissolved in DMSO-$d_6$, followed by $^1$H-NMR (500 MHz) analysis at 80° C. The ethylene unit content can be calculated using peaks derived from the main-chain methine of the vinyl ester (4.7 to 5.2 ppm) and peaks derived from the main-chain methylene of ethylene and the vinyl ester (0.8 to 1.6 ppm).

Degree of Saponification

The ethylene-vinyl alcohol copolymer of the present invention preferably has a degree of saponification of 80 mol % or more, more preferably 85 mol % or more, and even more preferably 90 mol % or more. Meanwhile, the degree of saponification is preferably 99.7 mol % or less more and preferably 99 mol % or less. When the degree of saponification is the lower limit or more, water resistance of coated paper to be obtained is further improved. Meanwhile, when the degree of saponification is the upper limit or less, barrier properties of coated paper to be obtained are further improved and stable production of the ethylene-vinyl alcohol copolymer is also facilitated. The degree of saponification of the ethylene-vinyl alcohol copolymer can be determined in accordance with JIS K6726 (1994).

Viscosity-Average Degree of Polymerization

The ethylene-vinyl alcohol copolymer of the present invention preferably has a viscosity-average degree of polymerization of 300 or more, more preferably 500 or more, even more preferably 700 or more, and particularly preferably 900 or more. Meanwhile, the viscosity-average degree of polymerization is preferably 5000 or less, more preferably 4000 or less, even more preferably 3500 or less, and particularly preferably 2400 or less. When the viscosity-average degree of polymerization is the lower limit or more, water resistance of coated paper to be obtained is further improved. Meanwhile, when the viscosity-average degree of polymerization is the upper limit or less, a coating agent solution (preferably, an aqueous solution) in which the ethylene-vinyl alcohol copolymer is dissolved has moderate viscosity and is thus readily handled. The viscosity-average degree of polymerization is referred to as P and can be determined in accordance with JIS K6726 (1994). That is, the ethylene-vinyl alcohol copolymer of the present invention is re-saponified to a degree of saponification of 99.5 mol % or more and purified, and then P can be calculated by the following equation using limiting viscosity [η] (L/g) determined in water at 30° C.

$$P = ([\eta] \times 10000/8.29)^{(1/0.62)}$$

Other Monomer Units

The ethylene-vinyl alcohol copolymer of the present invention may contain monomer units other than the vinyl alcohol units, the ethylene units, and the vinyl ester units as long as the effects of the present invention are not impaired. Examples of such other monomer units include units derived from: α-olefins, such as propylene, n-butene, and isobutylene; acrylic acid and salts thereof; acrylic esters; methacrylic acid and salts thereof; methacrylic esters; acrylamides; acrylamide derivatives, such as N-methylacrylamide, N-ethylacrylamide, N,N-dimethylacrylamide, diacetone acrylamide, acrylamide propanesulfonic acid and salts thereof, acrylamide propyldimethylamine and salts thereof and quaternary salts thereof, and N-methylolacrylamide and derivatives thereof; methacrylamides; methacrylamide derivatives, such as N-methylmethacrylamide, N-ethylmethacrylamide, methacrylamide propanesulfonic acid and salts thereof, methacrylamide propyldimethylamine and salts thereof and quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate and allyl chloride; unsaturated dicarboxylic acids, such as maleic acid, itaconic acid, and fumaric acid, and salts thereof and esters thereof; vinylsilyl compounds, such as vinyltrimethoxysilane; isopropenyl acetate; and the like. A content of these other monomer units is, depending on the intended objective, use, and the like, preferably 10 mol % or less, more preferably less than 5 mol %, even more preferably less than 1 mol %, and particularly preferably less than 0.5 mol %.

Method of Producing Ethylene-Vinyl Alcohol Copolymer

A preferred method of producing the ethylene-vinyl alcohol copolymer of the present invention is a method of producing the ethylene-vinyl alcohol copolymer by reacting ethylene with the vinyl ester to give an ethylene-vinyl ester copolymer and then saponifying the ethylene-vinyl ester copolymer, comprising, in production of the ethylene-vinyl ester copolymer, (a) the step of contacting a solution containing the vinyl ester with an ethylene-containing gas while stirring the solution with a wide paddle blade in a polymerization vessel to obtain a stirring power Pv per unit volume from 0.5 to 10 kW/m$^3$ and a Froude number Fr from 0.05 to 0.2. By contacting the solution containing the vinyl ester with the ethylene-containing gas in such a manner, the block character of the ethylene-vinyl units of the ethylene-vinyl alcohol copolymer can be within the above range. The production method will be detailed below.

Polymerization Step

In the polymerization step, ethylene is reacted (copolymerized) with the vinyl ester to give an ethylene-vinyl ester copolymer. The copolymerization of ethylene and the vinyl ester is preferably conducted by solution polymerization where ethylene and the vinyl ester are copolymerized in an organic solvent, such as an alcohol. Examples of the alcohol include lower alcohols, such as methanol and ethanol, particularly preferably methanol. Examples of an initiator used for the polymerization may be known initiators, such as azo initiators and peroxide initiators including 2,2'-azobis(isobutyronitrile), 2,2'-azobis(4-methoxy-2,4-dimethylvaleronitrile), 2,2'-azobis(2,4-dimethylvaleronitrile), benzoyl peroxide, n-propyl peroxydicarbonate, and the like.

In the polymerization, a chain transfer agent may coexist for adjustment of the viscosity-average degree of polymerization of the ethylene-vinyl ester copolymer thus obtained and the like. Examples of the chain transfer agent include aldehydes, such as acetaldehyde, propionaldehyde, butylaldehyde, and benzaldehyde; ketones, such as acetone, methyl ethyl ketone, hexanone, and cyclohexanone; mercaptans, such as 2-hydroxyethanethiol; thiocarboxylic acids, such as thioacetic acid; halogenated hydrocarbons, such as trichloroethylene and perchloroethylene; and the like. Among all, aldehydes and ketones are preferably used. The amount of the chain transfer agent depends on the chain transfer constant of the chain transfer agent to be added and a targeted viscosity-average degree of polymerization of the ethylene-vinyl ester copolymer, and it is generally from 0.1 to 10 parts by mass based on 100 parts by mass of the vinyl ester to be used.

The polymerization may be carried out by any of continuous polymerization, semi-batch polymerization, and batch polymerization, preferably continuous polymerization. Examples of a polymerization reactor include a continuous tank reactor, a batch reactor, a tube reactor, and the like, preferably a continuous tank reactor.

Figure 1:
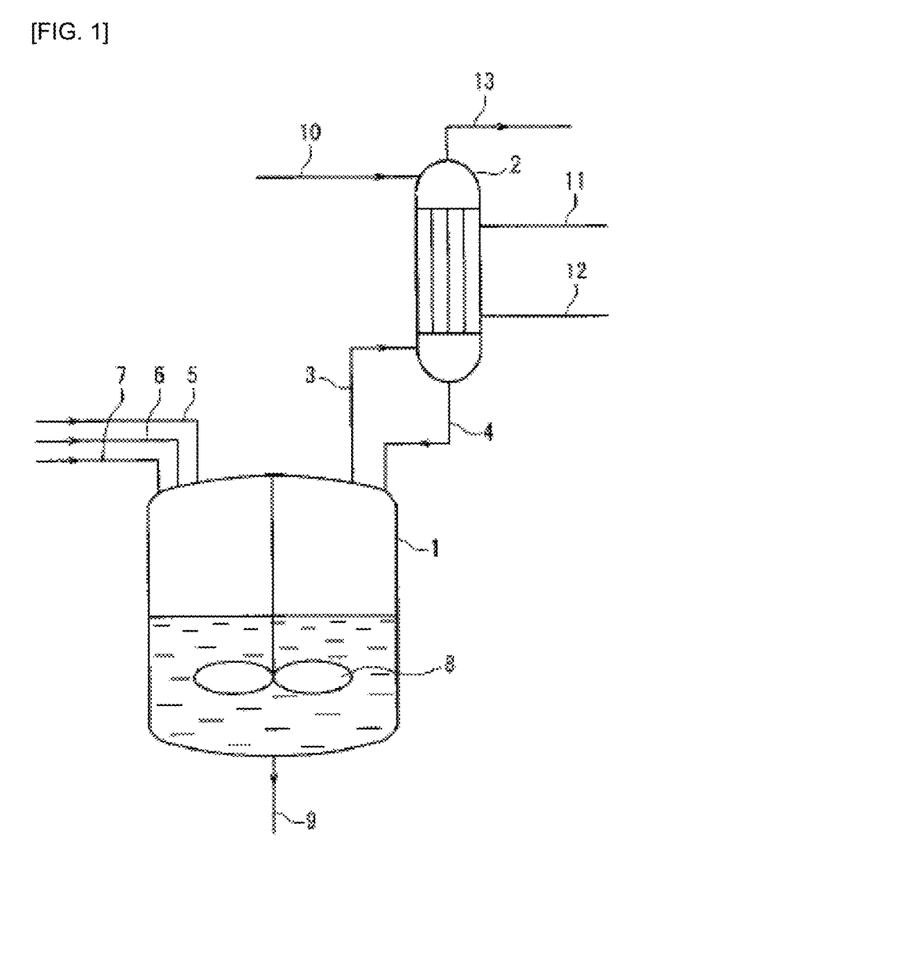
FIG. 1 is a schematic view of a polymerization apparatus used in Examples.

With reference to the drawings, a specific polymerization apparatus and the polymerization step using the apparatus are described below. FIG. 1 is a schematic view of a polymerization apparatus used in Example 1. The apparatus is a continuous tank reactor in which a polymerization vessel 1 is connected to a heat exchanger 2 via pipes 3 and 4. In the heat exchanger 2, the vinyl ester can be brought into countercurrent contact with ethylene.

A plurality of pipes 5, 6, 7 are connected to the polymerization vessel 1. The number and arrangement of the pipes are not limited to those illustrated in FIG. 1. Ethylene, the polymerization initiator, and the organic solvent are fed to the polymerization vessel 1 through these pipes. The ratio of the materials introduced into the polymerization vessel per unit time is preferably from 0.1 to 20 parts by mass for ethylene, from 1 to 100 parts by mass for the organic solvent, and from 0.00001 to 1 part by mass for the polymerization initiator based on 100 parts by mass of the vinyl ester. In some cases, the vinyl ester and the other monomers can be fed through these pipes. The reaction liquid in the polymerization vessel 1 is continuously discharged from a reaction liquid outlet pipe 9 connected to the bottom of the polymerization vessel 1.

In the polymerization vessel 1, a stirrer 8 having a wide paddle blade is placed as a stirring blade. The solution containing the vinyl ester is caused to contact the ethylene-containing gas while stirred with the wide paddle blade, thereby reacting ethylene with the vinyl ester to give an ethylene-vinyl ester copolymer.

Figure 2:
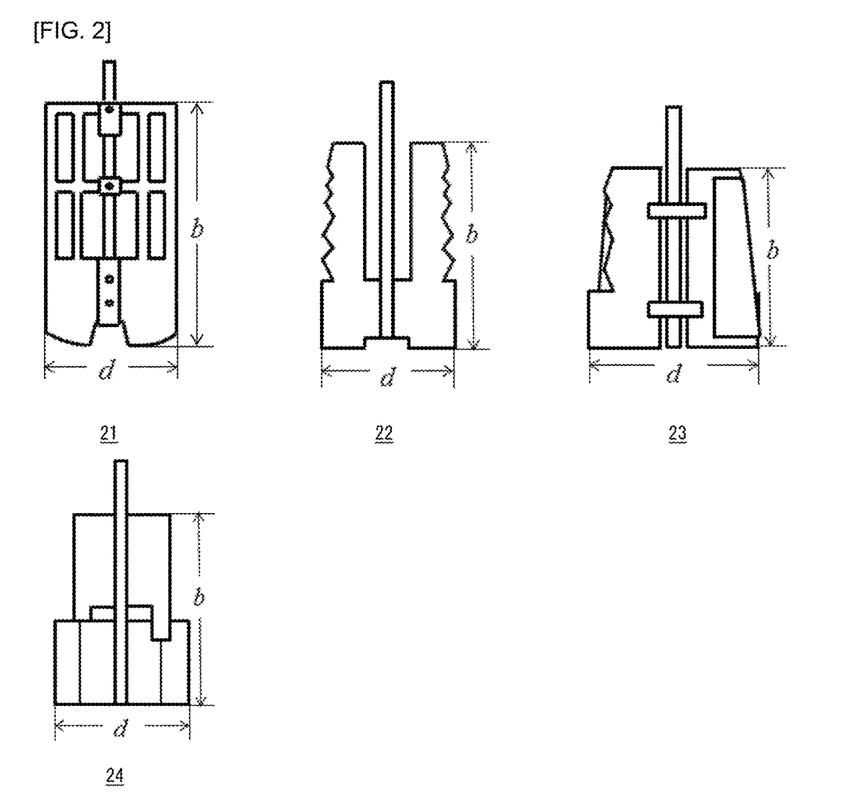
FIG. 2 is a schematic view of an exemplary wide paddle blade used in the present invention.

A wide paddle blade is preferably used as a stirring blade for stirring the solution containing the vinyl ester. FIG. 2 is a schematic view of an exemplary wide paddle blade used in the present invention. As illustrated in FIG. 2, the wide paddle blade is characterized in having a wide paddle with a width b.

The width b of the wide paddle blade can be appropriately adjusted by the volume of the polymerization vessel 1 and the like, and is preferably from 1 to 10 m as described later. Use of such a paddle causes the solution to be homogeneously mixed from the bottom to the surface of the solution and also ethylene to be efficiently absorbed by the solution containing the vinyl ester. The wide paddle blade may be a single blade type (e.g., Maxblend blade) or a multi-blade type (e.g., Fullzone blade). In the light of further efficient absorption of ethylene by the vinyl ester, the surface level of the solution containing the vinyl ester is preferably near the upper end of the stirring blade while stirring the solution. Specific examples of the wide paddle blade include Maxblend blades (Sumitomo Heavy Industries Process Equipment Co., Ltd.), Fullzone blades (Kobelco Eco-Solutions Co., Ltd.), Sanmeler blades (Mitsubishi Heavy Industries, Ltd.), Hi-Fi mixer blades (Soken Chemical & Engineering Co., Ltd.), Supermix blade (Satake Chemical Equipment Mfg., Ltd., Supermix MR203, Supermix MR205), and Bendleaf blades (Hakko Sangyo Co., Ltd.).

An ethylene pressure in the polymerization vessel during a polymerization reaction is preferably from 0.01 to 0.9 MPa, more preferably from 0.05 to 0.8 MPa, and even more preferably from 0.1 to 0.7 MPa. A polymerization ratio of the vinyl ester at an outlet of a polymerization vessel is, but not limited to, preferably from 10% to 90% and more preferably from 15% to 85%.

The polymerization temperature is, but not limited to, preferably from 0° C. to 180° C., more preferably from 20° C. to 160° C., and even more preferably from 30° C. to 150° C.

While ethylene is reacted with a vinyl ester, the solution containing the vinyl ester is preferably stirred to have a stirring power Pv per unit volume from 0.5 to 10 kW/m$^3$ in the polymerization vessel. If the stirring power is less than 0.5 kW/m$^3$, the amount of ethylene incorporated in the vinyl ester is insufficient and the homogeneity of the reaction liquid is also insufficient, so that it is not possible to obtain the ethylene-vinyl alcohol copolymer having a block character of the ethylene units within the above range. The stirring power is more preferably 1 kW/m$^3$ or more and even more preferably 1.5 kW/m$^3$ or more. If the stirring power is more than 10 kW/m$^3$, power used for operation becomes very large, which is industrially unfavorable. The stirring power is more preferably 7 kW/m$^3$ or less and even more preferably 5 kW/m$^3$ or less. The stirring power Pv per unit volume for the solution containing the vinyl ester is determined by a method described later in Examples.

The Froude number Fr is a ratio of inertial force to gravity defined by the following equation, which is an indicator of the vortex shape in the liquid surface.

$$Fr=n^2 \times d/g$$

n: rotation number (rps) of the stirring blade
d: stirring blade diameter (m)
g: gravity acceleration (m/s$^2$)

While ethylene is reacted with the vinyl ester, the solution containing the vinyl ester is preferably stirred to have a Froude number Fr from 0.05 to 0.2 in the polymerization vessel. By adjusting Froude number Fr within the above range to control the vortex shape in the liquid surface, ethylene is moderately absorbed by the vinyl ester and it is thus considered that the ethylene-vinyl alcohol copolymer having a block character of the ethylene units within the above range is readily obtained. The Froude number Fr is more preferably 0.06 or more and even more preferably 0.07 or more. The Froude number Fr is more preferably 0.18 or less and even more preferably 0.15 or less. The Froude number Fr may be controlled within the above range by appropriately varying the rotation number n or the diameter d of the stirring blade.

The stirring blade diameter d of the wide paddle blade is not particularly limited as long as the stirring power Pv and the Froude number Fr are adjusted within the above ranges, and it is preferably from 0.5 to 5 m in the light of improving ethylene absorption efficiency. The stirring blade diameter d is more preferably 0.75 m or more. The stirring blade diameter d is more preferably 4 m or less. The stirring blade diameter d is twice the distance from a rotating shaft to the distal end of the blade (the farthest point from the rotating shaft).

The width b (length in the height direction) of the wide paddle blade (paddle) is not particularly limited and may be adjusted to the volume of the polymerization vessel 1 and the like, and it is preferably from 1 to 10 m in the light of improving the ethylene absorption efficiency. The width b is more preferably 1.5 m or more. The width b is more preferably 8 m or less.

A ratio of the width (paddle width) b to the stirring blade diameter d (b/d) of the wide paddle blade is not particularly limited and may be determined depending on the shape of the polymerization vessel 1 or the like, and it is preferably 1 or more in the light of improving the ethylene absorption efficiency. The ratio (b/d) is generally 2.5 or less.

The shape of the polymerization vessel 1 is generally, but not limited to, almost columnar. In this case, the wide paddle blade is arranged in the almost columnar polymerization vessel 1 such that the rotating shaft of the wide paddle blade is aligned with the rotation axis of the polymerization vessel 1. A ratio (d/D) of the stirring blade diameter d (m) to an inner diameter D (m) of the polymerization vessel is not particularly limited as long as the effects of the present invention are not impaired. The ratio may be appropriately adjusted depending on the polymerization vessel to be used, and generally from 0.4 to 0.9. The volume of the polymerization vessel is generally, but not limited to, from 1 to 200 kl.

The rotation number n of the stirring blade is not particularly limited as long as the stirring power Pv and the Froude number Fr are adjusted within the above ranges, and it is preferably from 0.5 to 1.35 rps. If the rotation number n is less than 0.5 rps, the polymerization solution tends to be supercooled near a heat transfer surface, so that a gelatinous material is sometimes formed on the inner wall of the polymerization vessel, leading to difficulty in long-term operation. If the rotation number n is more than 1.35 rps, use of a low-viscosity polymerization solution sometimes causes the solution to splash and adhere to the inner wall of the gas-phase portion in the polymerization vessel. If such a deposit is solidified and mixed into the polymerization solution, a foreign matter is formed and thus sometimes causes failure of stable operation.

Conventionally, in production of an ethylene-vinyl alcohol copolymer, a stirring power per unit volume, which is an indicator of agitation strength, has been controlled. Such a stirring power is, however, influenced by various factors, such as the volume, the viscosity, and the density of a reaction liquid, the shape of a polymerization vessel, and the shape and the rotation number of a stirring blade. Accordingly, it is difficult to highly control the blocking properties of the ethylene units only by controlling the stirring power, resultantly leading to extension of ethylene chains (blocking of ethylene units), and the block character of the ethylene units in the ethylene-vinyl alcohol copolymer thus obtained is less than 0.90. Furthermore, the extension of ethylene chains causes stronger intermolecular hydrophobic interaction, and thus coated paper to be obtained used to have insufficient barrier properties. In addition, even in the case of adding carboxymethylcellulose to the ethylene-vinyl alcohol copolymer, there is still room to improve barrier properties and also its aqueous solution has reduced viscosity stability. As a result of intensive studies on these issues, the present inventors have found that a copolymer having shorter ethylene chains (ethylene units positioned at random) than those in the past is obtained by causing polymerization reaction to proceed under specific conditions and successfully improved both the viscosity stability of the aqueous solution of the ethylene-vinyl alcohol copolymer and the barrier properties of the coated paper to be obtained.

In the light of more highly controlling the block character of the ethylene units, the above production method preferably comprises: the polymerization step using the polymerization vessel connected to the heat exchanger via a pipe; and the steps of, in production of the ethylene-vinyl ester copolymer, (b) introducing the ethylene-containing gas in the gas-phase portion of the polymerization vessel into the heat exchanger, (c) feeding the vinyl ester to the heat exchanger, (d) contacting the vinyl ester with the ethylene-containing gas in the heat exchanger, and (e) discharging the vinyl ester containing ethylene dissolved therein from the heat exchanger and introducing the vinyl ester into the polymerization vessel. The vinyl ester may be directly fed to the polymerization vessel not through the heat exchanger. However, as the method described above, ethylene is efficiently absorbed by the vinyl ester by causing the vinyl ester to absorb ethylene in the heat exchanger in advance and then to be fed to the polymerization vessel, thereby the block character of the ethylene units can be highly controlled. Although part of the vinyl ester to be fed to the polymerization vessel may be contacted with the ethylene-containing gas in the heat exchanger, the total amount of the vinyl ester to be fed is preferably contacted with the ethylene-containing gas in the heat exchanger.

Although the heat exchanger to be used is not particularly limited, a heat exchanger with a large surface area is preferred in the light of efficient absorption of ethylene. Examples include a vertical wetted-wall heat exchanger, a vertical wetted-wall multitubular heat exchanger, a heat exchanger equipped with a jacket and/or a coil in a packed column type, a porous plate type, or a bubble cap type absorber. Among these, a vertical wetted-wall multitubular heat exchanger is more preferred.

In the apparatus illustrated in FIG. 1, a vertical wetted-wall multitubular heat exchanger is used as the heat exchanger 2. To the heat exchanger 2, a vinyl ester inlet pipe 10 is connected to feed the vinyl ester to an upper portion of the heat exchanger 2 through this pipe. The starting vinyl ester may be a vinyl ester alone or a mixed solution of the organic solvent and a vinyl ester, and the latter is preferred.

To the heat exchanger 2 illustrated in FIG. 1, refrigerant pipes 11 and 12 are connected. The positions of the pipes are not limited to those illustrated in FIG. 1, and it is preferred to feed a refrigerant from the refrigerant pipe 12 connected to a lower portion of the heat exchanger 2 and discharge the refrigerant from the refrigerant pipe 11 connected to the upper portion of the heat exchanger 2. With such connections, it is possible to efficiently cool the vinyl ester, resulting in high ethylene absorption efficiency. Examples of the refrigerant include, but not particularly limited to: aqueous solutions of an alcohol, such as methanol, ethanol, ethylene glycol, and glycerol; aqueous solutions of sodium chloride and calcium chloride; Freons; and the like. For the reasons of handleability, costs, and the like, aqueous solutions of an alcohol, particularly aqueous solutions of methanol are preferably used.

A gas discharge pipe 13 for discharging gas from the heat exchanger 2 is connected to the upper portion of the heat exchanger 2. A mist separator (not shown) may be connected to the gas discharge pipe 13. Droplets in the discharged gas are removed by the mist separator to allow mist-free ethylene to be collected or released. Such a mist separator is an apparatus for separating droplets suspended in gas using external force, such as gravity, centrifugal force, and electrostatic force, or a shielding or sieving effect. Examples of the mist separator include a gravity settler, a cyclone, an electrostatic precipitator, a scrubber, a bag filter, and a packed bed. Among these, a cyclone is preferred.

The method of contacting the vinyl ester with the ethylene-containing gas in the heat exchanger 2 is not particularly limited. Examples of the method include: a method comprising flowing the vinyl ester down from the upper portion of the heat exchanger 2 while feeding a pressurized ethylene-containing gas to the lower portion of the heat exchanger 2, and thus bringing them into countercurrent contact in the heat exchanger 2; a method of flowing the vinyl ester down from the upper portion of the heat exchanger 2 while feeding a pressurized ethylene-containing gas to the upper portion of the heat exchanger 2, and thus bringing them into cocurrent contact in the heat exchanger 2; and the like. In the light of efficient ethylene absorption, the former is preferred.

In the apparatus shown in FIG. 1, the two pipes 3 and 4 connect the polymerization vessel 1 to the heat exchanger 2. The ethylene-containing gas is introduced from the polymerization vessel 1 through the pipe 3 to the lower portion of the heat exchanger 2, and the vinyl ester having absorbed ethylene is introduced from the lower portion of the heat exchanger 2 through the pipe 4 to the polymerization vessel 1.

The vinyl ester is fed through the inlet pipe 10 to the heat exchanger 2. The vinyl ester introduced into the upper portion of the heat exchanger 2 absorbs ethylene while passing through the heat exchanger 2.

The ethylene-containing gas is introduced through the pipe 3 connected to the lower portion of the heat exchanger 2 into the heat exchanger 2. The pipe 3 on the heat exchanger side is connected to the lower portion of the heat exchanger 2, while the vinyl ester inlet pipe 10 is connected to the upper portion of the heat exchanger 2. The ethylene-containing gas flows up in the heat exchanger 2 while being brought into countercurrent contact with the vinyl ester. As a result, ethylene in the gas is dissolved in the vinyl ester.

The vinyl ester having absorbed ethylene is introduced through the pipe 4 into the polymerization vessel 1. For continuous production, ethylene is circulated in the polymerization vessel 1, the heat exchanger 2, and the pipes 3 and 4. Part of ethylene is contained in the vinyl ester to be discharged from the reaction liquid outlet pipe 9. Therefore, ethylene is replenished via at least one of the pipes 5, 6, and 7 from an ethylene supply source connected to the polymerization vessel 1.

Saponification Step

The ethylene-vinyl alcohol copolymer is produced by saponifying the ethylene-vinyl ester copolymer obtained in the polymerization step. In this procedure, the ethylene-vinyl ester copolymer is preferably saponified by alcoholysis or hydrolysis reaction in the presence of a catalyst in an organic solvent. Examples of the catalyst used in the saponification step include: basic catalysts, such as sodium hydroxide, potassium hydroxide, and sodium methoxide; and acidic catalysts, such as sulfuric acid, hydrochloric acid, and p-toluenesulfonic acid. Examples of the organic solvent used in the saponification step include, but not particularly limited to, alcohols, such as methanol and ethanol; esters, such as methyl acetate and ethyl acetate; ketones, such as acetone and methyl ethyl ketone; and aromatic hydrocarbons, such as benzene and toluene. They may be used alone or in combination of two or more. Among these, it is convenient and preferred to perform saponification reaction in the presence of sodium hydroxide as a basic catalyst using methanol or a mixed solution of methanol and methyl acetate as a solvent. The amount of the saponification catalyst is preferably from 0.001 to 0.5 as a molar ratio to the vinyl ester units in the ethylene-vinyl ester copolymer. The molar ratio is more preferably 0.002 or more. The molar ratio is more preferably 0.4 or less and even more preferably 0.3 or less.

After the saponification step, a pulverization step and a drying step may be conducted. The pulverization step may be divided into a preliminary pulverization step and a main pulverization step. After the saponification step, if necessary, a washing step may be further conducted to remove impurities, such as sodium acetate.

Compound having Conjugated Double Bond

The coating agent for paper of the present invention preferably further comprises a compound with a molecular weight of 1000 or less having a conjugated double bond. Use of the compound improves the stability and the barrier properties of the coating agent. Although the mechanism of the improvement is not clearly understood, it is assumed to be because conjugated double bond moieties interact with the ethylene units in the ethylene-vinyl alcohol copolymer in the polar solvent, thereby moderately inhibiting intermolecular interaction of the ethylene-vinyl alcohol copolymer with each other.

In the present invention, the compound with a molecular weight of 1000 or less having a conjugated double bond is preferably a compound having a conjugated double bond of aliphatic double bonds or a compound having a conjugated double bond of an aliphatic double bond and an aromatic ring. In the light of the stability and the barrier properties of the coating agent, the former is more preferred. The molecular weight is 1000 or less, preferably 800 or less, and more preferably 500 or less.

The compound having a conjugated double bond of aliphatic double bonds is a compound having a conjugated double bond with a structure where carbon-carbon double bonds and carbon-carbon single bonds are alternately connected, wherein the number of the carbon-carbon double bonds is two or more. Specific examples include conjugated diene compounds with a conjugated structure where two carbon-carbon double bonds and one carbon-carbon single bond are alternately connected; conjugated triene compounds with a conjugated structure where three carbon-carbon double bonds and two carbon-carbon single bonds are alternately connected (e.g., 2,4,6-octatriene); conjugated polyene compounds with a conjugated structure where a more number of carbon-carbon double bonds and carbon-carbon single bonds are alternately connected; and the like. Among all, in the light of the stability and the barrier properties of the coating agent, conjugated diene compounds are preferred. The compound with a molecular weight of 1000 or less having a conjugated double bond used in the present invention may contain independently a plurality of conjugated double bonds in one molecule; for example, compounds having three conjugated trienes in the same molecule, such as tung oil, may be included.

The compound with a molecular weight of 1000 or less having a conjugated double bond may have a functional group other than the conjugated double bond. Examples of such another functional group include: polar groups, such as carboxy groups and salts thereof, hydroxy groups, ester groups, carbonyl groups, ether groups, amino groups, dialkylamino groups, imino groups, amide groups, cyano groups, diazo groups, nitro groups, mercapto groups, sulfone groups, sulfoxide groups, sulfide groups, thiol groups, sulfonic acid groups and salts thereof, phosphoric acid groups and salts thereof, and a halogen atom; and nonpolar groups, such as phenyl groups. In the light of the stability and the barrier properties of the coating agent, as such another functional group, polar groups are preferred, and carboxy groups and salts thereof and hydroxy groups are more preferred. Such another functional group may be directly bonded to a carbon atom in the conjugated double bond or bonded at a position away from the conjugated double bond. A multiple bond in such another functional group may be at a position conjugatable with the conjugated double bond; for example, 1-phenyl-1,3-butadiene having a phenyl group, sorbic acid having a carboxy group, and the like may be used as the compound having a conjugated double bond. The compound with a molecular weight of 1000 or less having a conjugated double bond may have an unconjugated double bond or an unconjugated triple bond.

Specific examples of the compound with a molecular weight of 1000 or less having a conjugated double bond include compounds having a conjugated double bond of aliphatic double bonds, such as 2,3-dimethyl-1,3-butadiene, 4-methyl-1,3-pentadiene, 1-phenyl-1,3-butadiene, sorbic acid, and myrcene; and compounds having a conjugated double bond of an aliphatic double bond and an aromatic ring, such as 2,4-diphenyl-4-methyl-1-pentene, $\alpha$-methylstyrene polymers, and 1,3-diphenyl-1-butene.

The content of the compound with a molecular weight of 1000 or less having a conjugated double bond in the coating agent for paper is preferably 0.000001 to 0.01 parts by mass based on 100 parts by mass of the ethylene-vinyl alcohol copolymer. The content is more preferably 0.000002 parts by mass or more, and even more preferably 0.000003 parts by mass or more. The content is more preferably 0.0075 parts by mass or less, even more preferably 0.005 parts by mass or less, and particularly suitably 0.0025 parts by mass or less.

In the present invention, a method of adding the compound with a molecular weight of 1000 or less having a conjugated double bond is not particularly limited. Examples include: 1) a method comprising adding the compound to the obtained ethylene-vinyl ester copolymer, followed by saponification; 2) a method comprising adding the compound during saponification of the ethylene-vinyl ester copolymer; 3) a method comprising spraying a liquid containing the compound on the ethylene-vinyl alcohol copolymer; 4) a method comprising impregnating the ethylene-vinyl alcohol copolymer with a liquid containing the compound, followed by drying; 5) a method comprising preparing an aqueous solution containing the ethylene-vinyl alcohol copolymer and the compound, followed by drying; 6) a method comprising preparing an aqueous solution containing the ethylene-vinyl alcohol copolymer and the compound and using the aqueous solution for various applications; and the like. Among these, the methods 2) and 6) are preferred in the light of the ease of adjusting the content of the compound.

Coating Agent for Paper

The coating agent for paper is preferably a solution, more preferably an aqueous solution, in which the ethylene-vinyl alcohol copolymer is dissolved. When the coating agent for paper contains an ionomer described later, the ionomer may be dissolved or dispersed in the solution in which the ethylene-vinyl alcohol copolymer is dissolved. The total amount of solid content in the solution is generally 50 mass % or less, preferably 40 mass % or less, and more preferably 30 mass % or less.

The aqueous solution in which the ethylene-vinyl alcohol copolymer is dissolved used as the coating agent of the present invention may contain water-soluble organic solvents including alcohols such as methanol, ethylene glycol and glycerol, and Cellosolve. The content of the organic solvent is preferably 100 parts by mass or less based on 100 parts by mass of water, more preferably 50 parts by mass or less, and even more preferably 10 parts by mass or less, and the aqueous solution particularly preferably contains no solvent other than water.

The content of the ethylene-vinyl alcohol copolymer in the coating agent for paper is preferably from 0.1 to 30 mass %. When the content is 0.1 mass % or more, coating efficiency is even better. The content is more preferably 0.5 mass % or more, even more preferably 2 mass % or more, and particularly preferably 5 mass % or more. Meanwhile, when the content is 30 mass % or less, coatability is even better. The content is more preferably 25 mass % or less.

Ionomer

The coating agent for paper of the present invention preferably contains an ionomer. The coating agent for paper of the present invention containing an ionomer causes coated paper to be obtained using the coating agent for paper to have excellent barrier properties in a folded portion formed by folding the coated paper. The ionomer herein means a polymer compound with a structure that is intermolecularly crosslinked or aggregated by ions. Examples of the ionomer include polymer compounds having ionic functional groups, at least part of the ionic functional groups being bonded or interacted by the ions to cause the polymer compounds to have a structure crosslinked or aggregated with each other. The ions are not particularly limited and may be cations or anions. Examples of the ions include: metal ions of Group I in the periodic table, such as sodium ions and potassium ions; metal ions of Group II in the periodic table, such as magnesium ions; metal ions of Group XII in the periodic table, such as zinc ions; organic cations, such as organic ammonium ions; halide ions, such as chloride ions and bromide ions; and the like. Examples of such a polymer compound having ionic functional groups include, but not particularly limited to, copolymers of olefin with unsaturated carboxylic acid and/or a derivative thereof. Examples of the olefin include ethylene, propylene, styrene, and the like, and among all, ethylene is preferred. Examples of the unsaturated carboxylic acid include (meth)acrylic acid, maleic acid, fumaric acid, itaconic acid, crotonic acid, isocrotonic acid, citraconic acid, allylsuccinic acid, mesaconic acid, glutaconic acid, nadic acid, methylnadic acid, tetrahydrophthalic acid, methylhexahydrophthalic acid, and the like, and among all, acrylic acid and methacrylic acid are preferred. Examples of the derivative of the unsaturated carboxylic acid include unsaturated carboxylic esters, unsaturated carboxylic anhydrides, metal salts of unsaturated carboxylic acid, and the like. Specific examples of the polymer compounds having ionic functional groups include ethylene-(meth)acrylic acid copolymers, ethylene-(meth)acrylic acid-(meth)acrylic ester copolymers, styrene-grafted polymers of such an ethylene-(meth)acrylic acid copolymer, and the like.

When the coating agent for paper of the present invention contains the ionomer, the ionomer content in the coating agent for paper is preferably 0.1 mass % or more and more preferably 0.5 mass % or more. When the content is the lower limit or more, the coated paper prepared using the coating agent for paper has excellent barrier properties in the folded portion formed by folding the coated paper. The content is preferably 30 mass % or less, more preferably 25 mass % or less, and even more preferably 20 mass % or less. When the content is the upper limit or less, the coated paper prepared using the coating agent for paper has excellent barrier properties in flat portions.

When the coating agent for paper of the present invention contains the ionomer, in the light of excellent barrier properties in the folded portion of the coated paper to be obtained, a mass ratio of the ethylene-vinyl alcohol copolymer to the ionomer in the coating agent for paper (ethylene-vinyl alcohol copolymer/ionomer) is preferably 99/1 or less, more preferably 97/3 or less, even more preferably 94/6 or less, and particularly preferably 92/8 or less. Meanwhile, in the light of excellent barrier properties in the flat portions of the coated paper to be obtained, the mass ratio (ethylene-vinyl alcohol copolymer/ionomer) is preferably 1/99 or more, more preferably 5/95 or more, even more preferably 25/75 or more, particularly preferably 50/50 or more, and most preferably 65/35 or more.

The above effects of adding the ionomer are exhibited even when an ethylene-vinyl alcohol copolymer having a block character of the ethylene units outside the above range is used. Accordingly, even coating agents containing the ethylene-vinyl alcohol copolymer having a content of ethylene units of 1 mol % or more and less than 20 mol % and the ionomer are also preferably used for paper applications. Except for not limiting the block character, preferred embodiments of the ethylene-vinyl alcohol copolymer and the ionomer contained in the coating agent and other preferred embodiments of the coating agent are the same as those of the coating agent described above containing the ethylene-vinyl alcohol copolymer having a block character of the ethylene units within the predetermined range. Examples of the preferred embodiments of these coating agents are described later.

The coating agent of the present invention may contain various additives, as needed, including: waterproofing agents, such as glyoxal, urea resins, melamine resins, polyvalent metal salt, and water-soluble polyamide resins; plasticizers, such as glycols and glycerol; pH adjusters, such as ammonia, caustic soda, caustic soda, and phosphoric acid; defoamers; mold releases; surfactants; and colorants, such as pigments. The coating agent of the present invention may further contain, as long as the effects of the present invention are not impaired: modified PVAs other than the ethylene-vinyl alcohol copolymer, such as non-modified PVAs, carboxyl modified PVAs, sulfonic acid modified PVAs, acrylamide modified PVAs, cationic group modified PVAs, and long-chain alkyl group modified PVAs; water-soluble polymers, such as casein, raw starches (wheat, corn, rice, potato, sweet potato, tapioca, sago), raw starch degradation products (dextrin, etc.), starch derivatives (oxidized starch, etherified starch, esterified starch, cationized starch, etc.), and seaweed polysaccharides (sodium alginate, carrageenan, agar (agarose, agaropectin), furcellaran, etc.); and synthetic resin emulsions, such as styrene-butadiene copolymer latex, polyacrylic ester emulsions, vinyl acetate-ethylene copolymer emulsions, and vinyl acetate-acrylic ester copolymer emulsions.

The coating agent of the present invention described above is used for various paper applications, other than adhesives, such as coating agents for forming a filling layer in base paper for release paper, coating agents for forming a greaseproof layer in greaseproof paper, clear coating agents, white or colored coating agents containing pigments and the like, coating agents for forming an ink absorbing layer in inkjet printing materials, coating agents for forming an overcoat layer, a thermal coloring layer, and the like in thermal recording materials, and the like.

Coated Paper

A preferred embodiment of the present invention is coated paper obtained by coating paper with the coating agent. As base paper used for the coated paper, known paper and synthetic paper may be used that are made from chemical pulp, such as hardwood kraft pulp and softwood kraft pulp, mechanical pulp, such as GP (groundwood pulp), RGP (refiner groundwood pulp), and TMP (thermomechanical pulp), and the like. As the above paper, it is also possible to use wood free paper, wood containing paper, alkaline paper, glassine paper, semi-glassine paper, board and white lined board used for corrugated boards, for building materials, for manila board, for white lined chipboards, for chipboards, and the like. The basis weight of the paper may be adjusted depending on the use and is generally, but not particularly limited to, from 10 to 500 $g/m^2$ and preferably from 40 to 200 $g/m^2$. It should be noted that the paper used for the coated paper may contain organic or inorganic pigments and papermaking aids, such as paper strength additives, sizing agents, and retention aids. The paper used for the coated paper may also be subjected to various types of surface treatment.

The amount of the coating agent may be arbitrarily selected in accordance with the properties of the paper to be coated, and it is generally preferably from 0.1 to 30 $g/m^2$, approximately, in terms of solid content. The coating agent may be coated on a surface of the paper or may be impregnated into the paper. In the former case, the coating agent may be coated on one surface or both surfaces of the paper. Because the coating agent of the present invention readily forms a film, even a small amount of the coating agent causes a coating layer containing the ethylene-vinyl alcohol copolymer to be formed near the paper surface to improve the barrier properties. In the light of better use of such a characteristic, the coating agent is preferably coated on a paper surface.

Examples of the method of coating paper with the coating agent comprising the solution in which the ethylene-vinyl alcohol copolymer is dissolved include: a transfer system, such as a SymSizer and a gate roll coater; and an impregnation system, such as a size press. In the light of even easier formation of a coating layer, the transfer system is preferred. Meanwhile, since the coating agent of the present invention readily forms a film, even when the impregnation system is employed, penetration of the coating agent into paper is inhibited and a coating layer is efficiently formed near the surface. Accordingly, the amount of coating is reduced and the drying is also facilitated, and thus the costs are reduced. The temperature of the coating agent during coating is generally from normal temperature to 100° C.

The paper coated with the solution of the coating agent may be dried by known methods, such as methods using hot air, infrared rays, a heating cylinder, and combinations of them. The drying temperature is generally from normal temperature to 120° C. The dried coated paper may be subjected to humidity control and calender treatment for further improvement of the barrier properties. The calender treatment conditions generally include a roll temperature from normal temperature to 100° C. and a linear pressure of the rolls from 20 to 300 kg/cm.

The coated paper may have layers other than the coating layer containing the ethylene-vinyl alcohol copolymer, such as a release layer described later.

The coated paper obtained by coating paper with the coating agent is also used as specialty paper, such as base paper for release paper, greaseproof paper, thermal recording paper, inkjet printing paper, pressure sensitive paper, gas barrier paper, and other barrier paper. Among all, the coated paper is preferably used as base paper for release paper and greaseproof paper.

Base Paper for Release Paper

A more preferred embodiment of the present invention is base paper for release paper comprising the coated paper. When a release layer is formed on the base paper for release paper, the coating agent plays a role of a filling agent. In other words, base paper for release paper obtained by coating paper with the coating agent has a filling layer (barrier layer) formed on base paper. The filling layer formed using the coating agent of the present invention is excellent in barrier properties and water resistance and thus inhibits penetration of a release agent described later into paper. In addition, when water-dispersible varnish and the like are used, the barrier properties of the filling layer are also maintained. The filling layer is formed on at least one surface of the paper. The amount of the coating agent may be arbitrarily selected in accordance with the properties of the paper to be coated and is preferably from 0.3 to 3 $g/m^2$, approximately, per one surface of the paper.

In the light of further improvement of the barrier properties, the base paper for release paper preferably has air resistance measured using a smoothness and air permeability tester by the Oken method in accordance with JIS-P 8117: 2009 of 20000 seconds or more, more preferably 30000 seconds or more, and even more preferably 37000 seconds or more.

Release Paper

A preferred embodiment of the base paper for release paper is release paper having a release layer formed on the base paper for release paper. The release layer is formed on the filling layer. The release paper thus obtained may be preferably used for adhesive labels, adhesive tapes, industrial adhesive paper, mold release paper, and the like. As the release layer, silicone resins are preferably used. Examples of the release agent used to form such a release layer include solvent-based silicone and non-solvent based (emulsion-based, oligomer-based) silicone. Examples of the solvent contained in the release agent include organic solvents, such as toluene.

The release layer of the release paper of the present invention may appropriately contain chemicals generally used for papermaking other than the above components, such as pigments, fluorescent whitening agents, materials to be dyed with such a fluorescent whitening agent, defoamers, mold releases, colorants, water retention agents, and the like.

The release agent may be coated with general equipment for coating paper. For example, the coating agent may be coated in one layer or multiple layers on paper by an on-machine or off-machine coater equipped with a coating apparatus, such as a blade coater, an air knife coater, a transfer roll coater, a rod metering size press coater, a curtain coater, and a wire bar coater. As a method of drying after coating, various methods of drying by heating may be appropriately employed, such as methods using heating rotary drums, hot air heating, gas heaters, infrared heaters, and the like, for example. The amount of coating the release agent is generally from 0.1 to 2 $g/m^2$ in terms of solid content.

Examples of the water-dispersible varnish used for post-treatment include: conjugated diene-based latexes, such as styrene-butadiene copolymer latex, methyl methacrylate-butadiene copolymer latex, and styrene-methyl methacrylate-butadiene copolymer latex; acrylic latexes, such as polymer latexes and copolymer latexes of an acrylic ester and/or a methacrylic ester; and vinyl-based latexes, such as ethylene-vinyl acetate polymer latex, and one or more of them may be appropriately selected for use.

Greaseproof Paper

Another more preferred embodiment of the present invention is greaseproof paper comprising the coated paper. In the greaseproof paper, a coated layer is formed by coating at least one surface of the paper with the coating agent. The greaseproof paper formed to have such a coated layer is both highly grease resistant and water resistant. As the method of coating the coating agent, the methods described above as the method of forming the filling layer of the base paper for release paper are employed. The amount of the coating agent is generally from 0.1 to 20 g/m² in terms of solid content.

EXAMPLES

With reference to Examples, the present invention will then be described more specifically, but the present invention is not at all limited to these Examples. It should be noted that "%" and "part(s)" in Examples and Comparative Examples below respectively refer to "mass %" and "part(s) by mass" unless otherwise specified.

Viscosity-Average Degree of Polymerization and Degree of Saponification of Ethylene-Vinyl Alcohol Copolymer The viscosity-average degree of polymerization and the degree of saponification of the ethylene-vinyl alcohol copolymer were determined in accordance with the method described in JIS K6726 (1994).

Block Character of Ethylene Units of Ethylene-Vinyl Alcohol Copolymer

The ethylene-vinyl alcohol copolymer was saponified to a degree of saponification of 99.9 mol % or more, followed by thorough washing with methanol and then drying at 90° C. under reduced pressure for 2 days. The copolymer thus obtained was dissolved in DMSO-$d_6$ and analyzed by 600 MHz $^{13}$C-NMR at 80° C. Using the molar fraction of vinyl alcohol-ethylene two-unit chains (AE), the molar fraction of the vinyl alcohol units (A), and the molar fraction of the ethylene units (E) assigned and calculated from the obtained spectrum as described in T. Moritani and H. Iwasaki, 11, 1251-1259, Macromolecules (1978), the block character ($\eta$) of the ethylene units was determined according to the following equation:

$$\eta = (AE)/\{2 \times (A) \times (E)\}$$

Viscosity Stability of Coating Agent for Paper

An aqueous solution of the coating agent had an initial viscosity ($\eta_0$) at 30° C. The aqueous solution was poured into a 300 ml glass beaker and left at 30° C. for 1 day to give a viscosity ($\eta_1$). A ratio ($\eta_1/\eta_0$) was calculated for evaluation in accordance with the following criteria. The measurement was performed at 30° C. using a Brookfield viscometer (rotation number 12 rpm) in accordance with the rotational viscometer method in JIS K6726: 1994.

A: $\eta_1/\eta_0$ was 1 or more and less than 5, and gelation and phase separation of the aqueous solution were not found.

B: $\eta_1/\eta_0$ was 5 or more and less than 10, and gelation and phase separation of the aqueous solution were not found.

C: $\eta_1/\eta_0$ was 10 or more, or gelation or phase separation of the aqueous solution was found.

Evaluation of Coated Paper (1) Air Resistance

The air resistance of the coated paper was measured using a smoothness and air permeability tester by the Oken method in accordance with JIS-P 8117: 2009. The value of the air resistance indicates the time for 100 mL of air to pass through a certain area. Thus, a greater air resistance value indicates more difficulty for the air to pass through and higher filling properties.

(2) Bleed Through of Oil-Based Ink

The coated paper was printed on one surface by an oil-based pen and the degree of bleed of the ink through the non-printed surface was visually observed for evaluation in accordance with the following criteria.

A: no bleed through was found

B: partial bleed through was found

C: bleed through was found on the entire surface (3) Water Resistance Surface Strength After dropping approximately 0.1 ml of ion exchange water at 20° C. on a surface of the coated paper, the area was rubbed with a fingertip and the state of eluted coating agent was observed for evaluation in accordance with the following criteria.

A: no slimy feeling was found

B: slimy feeling was found, or part of the coating agent was emulsified

C: the entire coating agent was emulsified or dissolved (4) Degree of Grease Resistance Using coated paper prepared for determination of the degree of grease resistance, the degree of grease resistance in a flat portion and the degree of grease resistance in a folded portion were determined by the following method.

Degree of Grease Resistance in Flat Portion

In accordance with TAPPI No. T559 cm-02, the degree of grease resistance of the coated surface (flat portion) was determined. The determination was performed visually. It should be noted that commercially available greaseproof paper using a fluorine resin generally has a degree of grease resistance (KIT value) of fifth grade or higher and the degree of grease resistance causing no problem in general use is fifth grade or higher. Accordingly, coated paper preferably has a degree of grease resistance of fifth grade or higher, and for use expected to have higher grease resistance, preferably seventh grade or higher and even more preferably tenth grade or higher.

Degree of Grease Resistance in Folded Portion

The coated paper was folded in two to place the coated surface outside and pressed from above the folded area under conditions of a width of 1.0 mm, a depth of 0.7 mm, and a pressure of 2.5 kgf/cm² sec to completely form a fold, and then the coated paper was unfolded to determine the degree of grease resistance in the folded area in accordance with TAPPI No. T559 cm-02. The determination was performed visually. Because the degree of grease resistance causing no problem in folded portions is also fifth grade or higher, the degree of grease resistance is preferably fifth grade or higher in the area, and for use expected to have higher grease resistance, preferably seventh grade or higher and even more preferably tenth grade or higher.

FIG. 1 illustrates a schematic view of the polymerization apparatus used. Into an almost columnar polymerization vessel 1 [volume: 7 kl, vessel inner diameter D: 1.8 m] equipped with a Maxblend blade [from Kobelco Eco-Solutions Co., Ltd., stirring blade diameter (diameter) d: 1.1 m, blade (paddle) width b: 1.5 m] as a stirring blade 8, ethylene was introduced from a pipe 5 to have an inner ethylene pressure of 0.23 MPa and also a 1 mass % solution of 2,2'-azobis-(4-methoxy-2,4-dimethylvaleronitrile) as a polymerization initiator in methanol was introduced at a rate of 3 L/hr from a pipe 6. Furthermore, via an inlet pipe 10 and a heat exchanger 2, a vinyl acetate containing solution (vinyl acetate: 777 L/hr, methanol: 170 L/hr) was introduced into the polymerization vessel 1. The ethylene-containing gas was introduced from the polymerization vessel 1 through a pipe 3 into the heat exchanger 2. The vinyl acetate containing solution absorbed ethylene by flowing down along the pipe surface and was poured into the polymerization vessel 1 via a pipe 4 to be mixed with the reaction liquid and subjected to continuous polymerization with ethylene. The polymerization liquid was continuously removed through a pipe 9 to keep the liquid surface in the polymerization vessel 1 at a constant level. The conditions were regulated to have the polymerization ratio of vinyl acetate at the outlet of the polymerization vessel 1 at 30%. In addition, the conditions were regulated to have a stirring power Pv per unit volume of 2.2 kW/m$^3$ and a Froude number Fr of 0.13. The reaction liquid was stirred in the state where the entire blade (paddle) was immersed in the reaction liquid and also the surface level of the liquid was close to the upper end of the blade (paddle). The residence time of the reaction liquid in the polymerization vessel was 5 hours. The temperature at the outlet of the polymerization vessel was 60° C. Methanol vapor was introduced into the continuously removed polymerization liquid to remove the unreacted vinyl acetate monomer and thus to obtain a solution of an ethylene-vinyl acetate copolymer in methanol (concentration of 32%).

To the solution of an ethylene-vinyl acetate copolymer in methanol (concentration of 32%) obtained in the above polymerization step, a solution of sodium hydroxide as a saponification catalyst in methanol (concentration of 4 mass %) was added to have a molar ratio of sodium hydroxide to the vinyl acetate units in the ethylene-vinyl acetate copolymer of 0.012. Based on 100 parts by mass of the ethylene-vinyl acetate copolymer, 0.00009 parts by mass in terms of solid contents of a solution of sorbic acid in methanol (concentration of 10 mass %) was further added, and the mixture thus obtained was mixed with a static mixer and then placed on a belt to be retained at 40° C. for 18 minutes for proceeding of saponification reaction. Subsequently, the mixture was pulverized and dried to give an ethylene-vinyl alcohol copolymer (A-1) (hereinafter, referred to as a copolymer (A-1)). The copolymer (A-1) thus obtained had an ethylene unit content of 2 mol %, a viscosity-average degree of polymerization of 1700, a degree of saponification of 98.5 mol %, and a block character of the ethylene units of 0.95, and a sorbic acid content was 0.00018 parts by mass based on 100 parts by mass of the ethylene-vinyl alcohol copolymer.

Production of Copolymers (A-2), (A-3), (A-5), and (A-6) and PVA-7

Ethylene-vinyl alcohol copolymers (copolymers (A-2), (A-3), (A-5), and (A-6)) and a PVA (PVA-7) were produced in the same method as that for the copolymer (A-1) except for changing: during polymerization, the feeding amounts and the polymerization ratios of ethylene, vinyl acetate, methanol, and the initiator, the type of the stirring blade (A-6: Anchor blade, stirring blade diameter (diameter) d: 1.7 m, blade (paddle) width b: 0.85 m, not falling under the wide paddle blade due to the small blade (paddle) width b), the stirring power Pv, the Froude number Fr; and during saponification, the concentration of the ethylene-vinyl ester copolymer solution, the molar ratio of sodium hydroxide, and the type and the amount of the compound containing a conjugated double bond. Table 1 collectively shows the polymerization conditions and the saponification conditions during production, the degrees of polymerization, the degrees of saponification, the ethylene units, and the block characters of the polymers thus obtained, and the types and the contents of the compounds containing a conjugated double bond.

Production of Copolymer (A-4)

Into a polymerization vessel 1 [volume: 7 kl, vessel inner diameter D: 1.8 m] equipped with a two-stage inclined paddle blade [stirring blade diameter (diameter) d: 1.5 m, blade (paddle) width b: 0.88 m] as the stirring blade 8, ethylene was introduced from the pipe 5 to have an inner ethylene pressure of 0.61 MPa and also a 1 mass % solution of 2,2'-azobis-(4-methoxy-2,4-dimethylvaleronitrile) as a polymerization initiator in methanol was introduced at a rate of 9 L/hr from the pipe 6. Furthermore, from an inlet pipe 7, a vinyl acetate containing solution (vinyl acetate: 751 L/hr, methanol: 190 L/hr) was introduced into the polymerization vessel 1. The polymerization liquid was continuously removed through the pipe 9 to keep the liquid surface in the polymerization vessel 1 at a constant level. The conditions were regulated to have the polymerization ratio at the outlet of the polymerization vessel 1 at 43%. In addition, the conditions were regulated to have a stirring power Pv of 2 kW/m$^3$ and a Froude number Fr of 0.18. The residence time of the reaction liquid in the polymerization vessel was 5 hours. The temperature at the outlet of the polymerization vessel was 60° C. Methanol vapor was introduced into the continuously removed polymerization liquid to remove the unreacted vinyl acetate monomer and thus to obtain a solution of an ethylene-vinyl acetate copolymer (A-4) in methanol (concentration of 40%). The ethylene-vinyl alcohol copolymer (A-4) was produced by performing a saponification step in the same method as that for the copolymer (A-1) except for changing the concentration of the ethylene-vinyl ester copolymer solution and the molar ratio of sodium hydroxide. Table 1 collectively shows the polymerization conditions and the saponification conditions during production, the degree of polymerization, the degree of saponification, the ethylene units, and the block character of the polymer thus obtained, and the type and the content of the compound containing a conjugated double bond.

TABLE 1

| | Polymerization Conditions | | | | | | | | Saponification Conditions |
|---|---|---|---|---|---|---|---|---|---|
| | Ethylene Mpa | Vinyl Acetate L/hr | Methanol L/hr | Initiator L/hr | Polymerization Ratio % | Stirring Blade — | Pv kW/m$^3$ | Fr — | Supply of Vinyl Acetate — | PVAc Concentration mass % |
| A-1 | 0.23 | 777 | 170 | 3 | 30 | Maxblend Blade | 2.2 | 0.13 | Heat Exchanger | 32 |
| A-2 | 0.47 | 820 | 128 | 2.5 | 28 | Maxblend Blade | 3 | 0.11 | Heat Exchanger | 30 |
| A-3 | 0.69 | 682 | 185 | 82.6 | 70 | Maxblend Blade | 1.9 | 0.1 | Heat Exchanger | 45 |

TABLE 1-continued

| | | | | | | | | | | |
|---|---|---|---|---|---|---|---|---|---|---|
| A-4 | 0.61 | 751 | 190 | 9 | 43 | Two-Stage Inclined Paddle Blade | 2 | 0.18 | Direct | 40 |
| A-5 | 0.1 | 745 | 2 | 202.7 | 78 | Maxblend Blade | 6.9 | 0.21 | Heat Exchanger | 45 |
| A-6[3)] | 1.77 | 735 | 174 | 41 | 50 | Anchor Blade | 1.8 | 0.17 | Heat Exchanger | 40 |
| PVA-7 | 0 | 700 | 280 | 2.5 | 35 | Maxblend Blade | 2.1 | 0.14 | Heat Exchanger | 30 |

| | Ethylene-Vinyl Alcohol Copolymer | | | | | | |
|---|---|---|---|---|---|---|---|
| | Saponification Conditions | | | | | Compound Containing Conjugated Double Bond | |
| | NaOH Molar Ratio | Ethylene Units (mol %) | Degree of Polymerization | Degree of Saponification (mol %) | Block Character | Type [1)] | Content [2)] (parts by mass) |
| A-1 | 0.012 | 2 | 1700 | 98.5 | 0.95 | SA | $1.8 \times 10^{-4}$ |
| A-2 | 0.012 | 4 | 1700 | 98.5 | 0.97 | SA | $1.8 \times 10^{-4}$ |
| A-3 | 0.015 | 10 | 400 | 98 | 0.98 | — | — |
| A-4 | 0.02 | 6 | 1000 | 99.2 | 0.85 | SA | $1.8 \times 10^{-4}$ |
| A-5 | 0.008 | 2 | 500 | 88 | 1.01 | SA | $1.8 \times 10^{-4}$ |
| A-6[3)] | 0.03 | 22 | — | — | 0.99 | — | — |
| PVA-7 | 0.01 | 0 | 1700 | 98.5 | — | DPMP | $40 \times 10^{-4}$ |

[1)] SA: Sorbic Acid, DPMP: 2,4-diphenyl-4-methyl-1-pentene
[2)] Content of Compound having Conjugated Double Bond based on 100 parts by mass of Ethylene-Vinyl Alcohol Copolymer
[3)] The ethylene-vinyl alcohol copolymer thus obtained was insoluble in water.

Example 1

Preparation of Coating Agent for Paper

Powder (10 parts) of the ethylene-vinyl alcohol copolymer (A-1) thus obtained was charged into water (90 parts, 20° C.) under stirring and heated to 95° C. to obtain a coating agent (aqueous solution) in which the ethylene-vinyl alcohol copolymer (A-1) was dissolved. The viscosity stability of the coating agent thus obtained was evaluated by the method described above. The result is shown in Table 2.

Preparation of Coated Paper for Measuring Air Resistance, Bleed Through of Oil-Based Ink, Water Resistance Surface Strength Using a 2-roll test size press (from Kumagai Riki Kogyo Co., Ltd.), the coating agent thus obtained was coated on PPC (plain paper copier) paper (wood free paper) having a basis weight of 70 g/m² and an air resistance of 20 sec under conditions of 50° C. and 100 m/min., followed by drying at 100° C. for 5 minutes to obtain coated paper. The amount of the coating agent was 0.8 g/m² (the total amount of both surfaces) in terms of solid content. The coated paper thus obtained was subjected to humidity control at 20° C. and 65% RH for 72 hours and then the properties of the coated paper were evaluated. The results are shown in Table 2.

Preparation of Coated Paper for Measuring Degree of Grease Resistance

Coated paper was obtained in the same manner as above except for changing the amount of the coating agent to 3.5 g/m² (the total amount of both surfaces) in terms of solid content. The coated paper thus obtained was subjected to humidity control at 20° C. and 65% RH for 72 hours and then the properties of the coated paper were evaluated. The results are shown in Table 2.

Examples 2 and 3 and Comparative Examples 1 Through 4

Coating agents and coated paper were prepared in the same manner as that in Example 1 except for changing the ethylene-vinyl alcohol copolymer (A-1) to ethylene-vinyl alcohol copolymers (A-2) through (A-6) and PVA-7 shown in Table 2 to evaluate the properties of the coating agents and the coated paper. The results are shown in Table 2. It should be noted that the copolymer (A-6) was insoluble in water and an aqueous solution was thus not obtained.

Examples 4 Through 7

Powder (10 parts) of the ethylene-vinyl alcohol copolymer (A-2) was charged into water (90 parts, 20° C.) under stirring and heated to 95° C. to obtain an aqueous solution in which the ethylene-vinyl alcohol copolymer (A-2) was dissolved. The aqueous solution, an ionomer (CHEMIPEARL® S-100 from Mitsui Chemicals, Inc., aqueous dispersion of ethylene-acrylic acid copolymer sodium salt), and water, as needed, were mixed to obtain a coating agent of the ionomer dispersed in the aqueous solution in which the copolymer (A-2) was dissolved. In this procedure, the amounts of the aqueous solution, the ionomer, and water were adjusted to obtain the coating agent with the composition as shown in Table 2. The coating agent thus obtained was evaluated in the same manner as that in Example 1. In addition, coated paper was prepared and the properties of the coated paper were evaluated in the same manner as that in Example 1 except for using the coating agent thus obtained. These results are shown in Table 2.

Comparative Example 5

Coated paper was prepared in the same manner as that in Example 1 except for changing the ethylene-vinyl alcohol copolymer (A-1) to the copolymer (A-4) and adding 5 parts by mass of carboxymethylcellulose (CMC) based on 100 parts by mass of the copolymer (A-4) to evaluate the properties of the coated paper. The results are shown in Table 2.

TABLE 2

| | Coating Agent | | | | | | | |
|---|---|---|---|---|---|---|---|---|
| | Ethylene-Vinyl Alcohol Copolymer | | | | | | Ionomer | Water |
| | Type | Ethylene Units (mol %) | Degree of Polymerization | Degree of Saponification (mol %) | Block Character | Content (parts by mass) | Content (parts by mass) | Content (parts by mass) |
| Example 1 | A-1 | 2 | 1700 | 98.5 | 0.95 | 10 | — | 90 |
| Example 2 | A-2 | 4 | 1700 | 98.5 | 0.97 | 10 | — | 90 |
| Example 3 | A-3 | 10 | 400 | 98 | 0.98 | 10 | — | 90 |
| Example 4 | A-2 | 4 | 1700 | 98.5 | 0.97 | 9 | 1 | 90 |
| Example 5 | A-2 | 4 | 1700 | 98.5 | 0.97 | 7 | 3 | 90 |
| Example 6 | A-2 | 4 | 1700 | 98.5 | 0.97 | 3 | 7 | 90 |
| Example 7 | A-2 | 4 | 1700 | 98.5 | 0.97 | 1 | 9 | 90 |
| Comparative Example 1 | A-4 | 6 | 1000 | 99.2 | 0.85 | 10 | — | 90 |
| Comparative Example 2 | A-5 | 2 | 500 | 88 | 1.01 | 10 | — | 90 |
| Comparative Example 3[3)] | A-6 | 22 | — | — | 0.99 | — | — | — |
| Comparative Example 4 | PVA-7 | 0 | 1700 | 98.5 | — | 10 | — | 90 |
| Comparative Example 5[4)] | A-4 | 6 | 1000 | 99.2 | 0.85 | 10 | — | 90 |

| | Coating Agent | | Evaluation | | | | | |
|---|---|---|---|---|---|---|---|---|
| | Compound having Conjugated Double Bond | | | Coated Paper | | | | |
| | | | Coating | | | Water | degree of grease | |
| | | Content [2)] | Agent | Air | Bleed | Resistance | resistance | |
| | Type [1)] | (parts by mass) | Viscosity Stability | Resistance (sec) | Through of Ink | Surface Strength | Flat Portion | Folded portion |
| Example 1 | SA | $1.8 \times 10^{-4}$ | A | 45000 | A | A | 12 | 3 |
| Example 2 | SA | $1.8 \times 10^{-4}$ | A | 50000 | A | A | 12 | 3 |
| Example 3 | — | — | B | 35000 | A | A | 10 | 4 |
| Example 4 | SA | $1.8 \times 10^{-4}$ | A | 45000 | A | A | 12 | 10 |
| Example 5 | SA | $1.8 \times 10^{-4}$ | A | 35000 | A | A | 11 | 10 |
| Example 6 | SA | $1.8 \times 10^{-4}$ | A | 25000 | A | B | 7 | 7 |
| Example 7 | SA | $1.8 \times 10^{-4}$ | A | 20000 | B | B | 5 | 5 |
| Comparative Example 1 | SA | $1.8 \times 10^{-4}$ | B | 6000 | C | A | 5 | 3 |
| Comparative Example 2 | SA | $1.8 \times 10^{-4}$ | A | 10000 | B | C | 5 | 3 |
| Comparative Example 3[3)] | — | — | | | | | | |
| Comparative Example 4 | DPMP | $40 \times 10^{-4}$ | C | 3000 | C | B | 4 | 2 |
| Comparative Example 5[4)] | SA | $1.8 \times 10^{-4}$ | C | 12000 | B | A | 3 | 3 |

[1)] DPMP: 2,4-diphenyl-4-methyl-1-pentene, SA: Sorbic Acid
[2)] Content of Compound having Conjugated Double Bond based on 100 parts by mass of Ethylene-Vinyl Alcohol Copolymer
[3)] The ethylene-vinyl alcohol copolymer thus obtained was insoluble in water.
[4)] 5 parts by mass of carboxymethylcellulose was added based on 100 parts by mass of the copolymer(A-4).

DESCRIPTION OF REFERENCE NUMERALS

1: Polymerization Vessel
2: Heat Exchanger
3 to 7: Pipe
8: Stirrer
9: Reaction Liquid Outlet Pipe
10: Vinyl Ester Inlet Pipe
11, 12: Refrigerant Pipe
13: Gas Discharge Pipe
21: Maxblend Blade
22: Supermix MR203
23: Supermix MR205
24: Fullzone Blade

The invention claimed is:

1. A coating agent for paper comprising: an ethylene-vinyl alcohol copolymer, wherein the ethylene-vinyl alcohol copolymer has a content of ethylene units of 1 mol % or more and less than 20 mol % and a block character of the ethylene units from 0.90 to 0.99.

2. The coating agent for paper according to claim 1, further comprising from 0.000001 to 0.01 parts by mass of a compound with a molecular weight of 1000 or less having a conjugated double bond based on 100 parts by mass of the ethylene-vinyl alcohol copolymer.

3. The coating agent for paper according to claim 1, wherein the ethylene-vinyl alcohol copolymer has a degree of saponification from 80 to 99.7 mol %.

4. The coating agent for paper according to claim 1, wherein the ethylene-vinyl alcohol copolymer has a viscosity-average degree of polymerization from 300 to 5000.

5. The coating agent for paper according to claim 1, further comprising an ionomer.

6. Coated paper obtained by coating paper with the coating agent according to claim 1.

7. The coated paper according to claim 6, wherein the coated paper is base paper for release paper.

8. The coated paper according to claim 6, wherein the coated paper is greaseproof paper.

9. The coating agent for paper of claim 1, wherein the ethylene-vinyl alcohol copolymer has a content of ethylene units of 1.5 mol % or more.

10. The coating agent for paper of claim 1, wherein the ethylene-vinyl alcohol copolymer has a content of ethylene units of 2.5 mol % or more.

11. The coating agent for paper of claim 1, wherein the ethylene-vinyl alcohol copolymer has a content of ethylene units of 20 mol % or less.

12. The coating agent for paper of claim 1, wherein the ethylene-vinyl alcohol copolymer has a content of ethylene units of 10 mol % or less.

13. The coating agent for paper of claim 1, wherein the ethylene-vinyl alcohol copolymer has a content of ethylene units of 8.5 mol % or less.

14. The coating agent for paper according to claim 1, wherein the ethylene-vinyl alcohol copolymer has a viscosity-average degree of polymerization of 500 or more.

15. The coating agent for paper according to claim 1, wherein the ethylene-vinyl alcohol copolymer has a viscosity-average degree of polymerization of 900 or more.

16. The coating agent for paper according to claim 1, wherein the ethylene-vinyl alcohol copolymer has a viscosity-average degree of polymerization of 4000 or less.

17. The coating agent for paper according to claim 1, wherein the ethylene-vinyl alcohol copolymer has a viscosity-average degree of polymerization of 3500 or less.

18. The coating agent for paper according to claim 1, wherein the ethylene-vinyl alcohol copolymer has a viscosity-average degree of polymerization of 2400 or less.

19. A method of producing coated paper, the method comprising coating paper with the coating agent according claim 1.

20. A method of producing coated paper, the method comprising coating paper with the coating agent according to claim 2.

* * * * *